UNITED STATES PATENT OFFICE.

FRANC D. MAYER, OF CHICAGO, ILLINOIS.

TIRE-FILLER AND METHOD OF MAKING THE SAME.

1,351,670.  Specification of Letters Patent.  Patented Aug. 31, 1920.

No Drawing.  Application filed January 27, 1919. Serial No. 273,239.

*To all whom it may concern:*

Be it known that I, FRANC D. MAYER, a citizen of the United States, residing at Chicago, county of Cook, and State of Illinois, have invented certain new and useful Improvements in Tire-Fillers and in Methods of Making the Same, of which the following is a specification.

This invention relates to a new tire filler and to a method of making the same.

An object of the invention is to provide a tire filler of suitable resiliency and durability and consisting of ingredients which are more economical than the ingredients at present in practical use.

Another object of the invention is to make a tire filler in which the resiliency of the ingredients is maintained for a longer time, and in which vulcanization of the ingredients, in spite of the presence of relatively large quantities of sulfur compounds, is prevented.

It is also an object of the invention to devise a method of making this filler whereby the rapid hardening of the ingredients entering into the compound is prevented, so that the filler, in liquid or semi-liquid form, can be transferred to suitable molds in which other ingredients are introduced to coagulate the filler.

The main ingredients of the filler are a vegetable oil, sulfur chlorid, and calcium hydroxid. While it has been known to make a filler the main ingredients of which are corn oil and chlorid of sulfur, the hardening ingredient which has been used up to the present time consisted of oxid of magnesia, a substance which is relatively expensive. In the improved filler slaked lime (calcium hydroxid) forms one of the important ingredients and this substance can be purchased at a lower rate and serves its purpose to a higher degree than oxid of magnesia. While oxid of magnesia as well as lime retard the speed of vulcanization, it is to be noted that lime is less active and the vulcanization, therefore, is not retarded to the same extent as by the use of oxid of magnesia. Instead of corn oil any vegetable oil may then be used. The preferred oil which enters into the combination of the improved filler is sunflower seed oil. A soluble dye of any desired shade may be added to the mixture in a small quantity to improve the appearance of the mass.

The preferred combination for a batch of this filler is as follows:
152 lbs. sunflower seed oil.
32 lbs. sulfur chlorid
5 lbs. calcium hydroxid
4 ozs. soluble dyes
8 lbs. soap oil.

In the method of making the filler, the mixture of oil, calcium hydroxid, and dyes is made first. To this mixture, into which the ingredients enter in the proportion stated above, a portion only of the sulfur chlorid is added, as, for instance, 16 lbs. The mixture is then left standing for twenty-four hours, whereupon the balance of the sulfur chlorid is poured in while the entire mass is being agitated. After the entire necessary quantity of sulfur chlorid has been added under agitation, the mass is transferred into suitable molds, where it will coagulate to the desired degree of hardness.

Soap oil is an intermediary product of treatment of crude oil and is characterized by the following qualities: Its specific gravity is 30.7 Baumé, its flash point is 255 to 260 degrees F., its boiling point 270 degrees F. These qualities may vary slightly, depending upon the stage of refinement.

For the purpose of retarding the vulcanization of the mass described above, soap oil is added, preferably in the proportion stated. The oil itself will not enter into the vulcanization, but will delay vulcanization of the other products. Vulcanization of the mass prior to the introduction into the molds frequently leads to the loss of the entire product, as through vulcanization the material becomes solid almost immediately upon mixing and before it can be transferred into the molds. Thus vulcanization will be retarded, and the amount of soap oil which may be added is suitable to cause this retardation for a longer or shorter time.

I claim:

1. A tire filler, consisting of the following ingredients in the proportion stated: 152 lbs. of sunflower seed oil, 32 lbs. of sulfur chlorid, 5 lbs. of calcium hydroxid, 4 ozs. of soluble dyes, and 8 lbs. of soap oil.

2. A tire filler, comprising a vegetable oil, sulfur chlorid, calcium hydroxid, and soap oil.

3. A method of making a tire filler, which consists of mixing a vegetable oil, calcium hydroxid, and a soluble dye, adding to this mixture a quantity of sulfur chlorid, letting the mixture stand, and adding after the matter has settled an additional quantity of sulfur chlorid while the mass is being agitated.

4. A method of making a tire filler, which consists of mixing a vegetable oil with calcium hydroxid and a soluble dye, adding sulfur chlorid to this mixture, adding soap oil thereto, letting the mixture stand for twenty-four hours, and introducing an additional quantity of sulfur chlorid after the twenty-four hours.

5. A method of making a tire filler, which consists of mixing a vegetable oil with a certain amount of sulfur chlorid, calcium hydroxid, soap oil, and a soluble dye, letting the mixture stand for twenty-four hours, and adding to this mixture while it is being agitated, after the period of twenty-four hours, a quantity of sulfur chlorid equal to the quantity first introduced, and transferring the mixture to molds.

In testimony whereof I affix my signature in the presence of two witnesses.

FRANC D. MAYER.

Witnesses:
DANIEL A. BRENNAN,
T. R. HAEGELE.